Dec. 18, 1934.   B. F. MIESSNER   1,984,418

ELECTRICAL RECTIFYING AND FILTERING SYSTEM

Filed March 6, 1929

WITNESS
Oliver W. Holmes

Inventor
BENJAMIN F. MIESSNER
By Attorney

Patented Dec. 18, 1934

1,984,418

UNITED STATES PATENT OFFICE 1,984,418

ELECTRICAL RECTIFYING AND FILTERING SYSTEM

Benjamin F. Miessner, Short Hills, N. J., assignor, by mesne assignments, to Radio Corporation of America, New York, N. Y., a corporation of Delaware Application March 6, 1929, Serial No. 344,884

10 Claims. (Cl. 175—363)

The present invention relates to electrical rectifying and filtering systems, and more particularly to such a system including means for neutralizing the alternating current component from the output thereof.

The invention is described with the aid of the figures of the accompanying drawing in which like reference characters represent like parts in the several figures so fas as possible.

Figure 1:
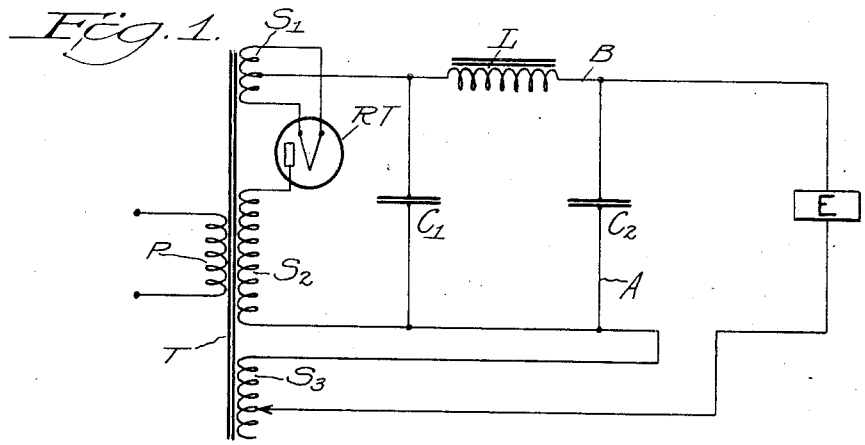
Fig. 1 illustrates in diagram a rectifying and filtering system including one embodiment of my invention.

Referring to Fig. 1 I show an alternating current source supplying a rectifying and filtering system through a transformer T having primary winding P, a secondary winding $S_1$ for heating the filament of a single wave rectifier tube RT, and a secondary winding $S_2$ for supplying current to be rectified. The filter is shown to include the usual choke coil L and filter condensers $C_1$ and $C_2$, and connected to a load E, such for example as the plate circuits of a cascaded series of three electrode vacuum tubes of an amplifier.

With the single wave rectifier RT the filter will supply a unidirectional current to load E having a rippling component of the same frequency as the frequency of the source of supply. For example, with a supply of 60 cycle commercial alternating current the ripple will be mainly a 60 cycle one. To neutralize this ripple I introduce into the system an alternating current of phase opposed thereto through a secondary winding $S_3$; providing for controlling the amplitude of this opposing current in some suitable manner, as by fixing the number of turns of secondary $S_3$ as indicated by a variable contact, but of course the correct number of turns can be determined and fixed in a given design. The current thus introduced is of the same frequency as the ripple component in the filter system, and the opposing phase is readily obtained by selecting proper polarity of connections of winding $S_3$. Winding $S_3$ may be connected into the filter system at points other than as shown, as for example at such points as those marked A and B.

Figure 2:
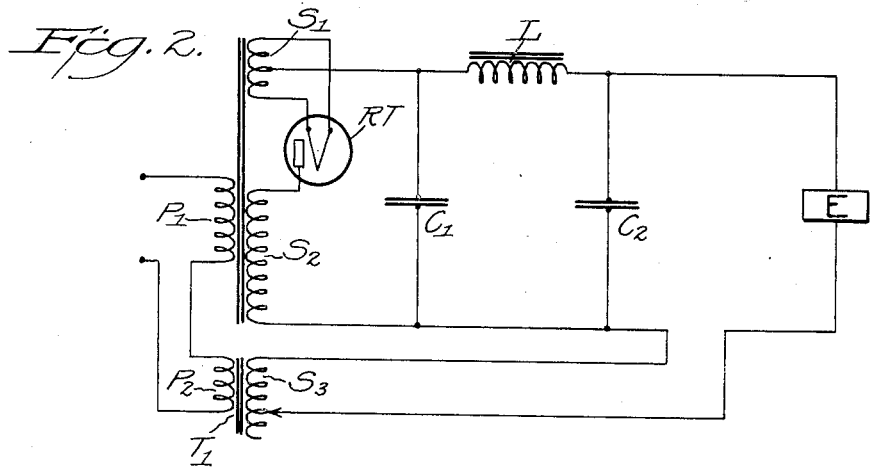
Fig. 2 is a modification thereof.

Fig. 2 differs from Fig. 1 in that a separate transformer $T_1$ is employed for developing the potential in secondary $S_3$ for opposing the rippling component in the filtered current. The primary $P_2$ of this separate transformer is shown connected in series with primary $P_1$ of the main transformer, though it may be connected in parallel relation.

A separate transformer is of advantage in case the rippling component of the filtered current has considerable energy in a 120 cycle harmonic or higher harmonics, for the separate neutralizing transformer may be designed to produce these harmonics also, as by designing the core thereof so that the filtered current passing through secondary $S_3$ will saturate the core sufficiently to produce the desired harmonic producing distortion.

Figure 3:
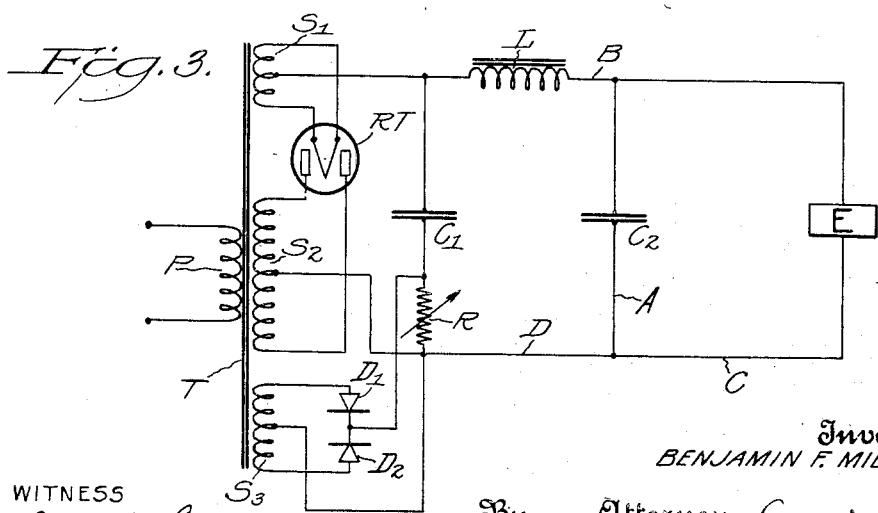
Fig. 3 illustrates in diagram a system including a rectifier different from that in Fig. 1 and including a modified embodiment of my invention adapted to function with the different rectifier.

In Fig. 3 I show the rectifier RT of the so-called full wave form which develops a rippling component of double the frequency of the supply source; that is, 120 cycles for a 60 cycle supply. As in Fig. 1 the filter system includes cross-connected condensers $C_1$ and $C_2$ on opposite sides of filter choke coil L, the filter feeding a load E. A second full wave rectifier system comprising rectifier elements $D_1$ and $D_2$ supplied from secondary $S_3$ develops across resistance R a double frequency ripple voltage, connected to be opposed in phase to the double frequency ripple voltage in the filtered current, and may be adjusted by selection of transformer characteristics and value of resistance R to be equal to the filter current ripple.

This low voltage neutralizing rectifier system may be connected in circuit with the main system at points other than as shown, as for example the indicated points A, B, C and D.

The high voltage rectifier RT may be of any suitable type, vacuum tube and gas filled tubes being usual. The low voltage rectifiers $D_1$ and $D_2$ may also be of any type, but the so-called cuprous oxide and like fixed rectifiers are quite suitable for the low voltage operation involved.

While I have illustrated and described my invention in connection with particular adaptations thereof, no limitations are intended by reason of such choice for explanatory purposes, various other adaptations being readily apparent to those skilled in the art.

Having thus described my invention, what I claim is:

1. In an electrical rectifying and filtering system, the combination of a source of alternating current energy, a rectifier coupled thereto for rectifying at least a half wave thereof for the production of unidirectional current energy, a filter choke and condenser system connected to said rectifier for reducing the ripple component of said unidirectional current, a resistance within said filter choke and condenser system, and means for impressing a rippling potential from said source across said resistance whereby the remaining ripple component of said unidirectional current energy is substantially neutralized.

2. In an electrical rectifying and filtering system, the combination of a source of alternating current energy, a rectifier coupled thereto for rectifying at least a half wave thereof for the production of unidirectional current energy, a filter choke and condenser system connected to said rectifier for reducing the ripple component of said unidirectional current, a resistance within said filter choke and condenser system, and means for impressing a rippling potential from said source across said resistance whereby the remaining ripple component of said unidirectional current energy is substantially neutralized, said means consisting of a transformer secondary energized from said source and a second rectifier, said second rectifier and resistance being series connected across said secondary.

3. In an electrical rectifying and filtering system, the combination of a source of alternating current energy, a rectifier coupled thereto for rectifying at least a half wave thereof for the production of unidirectional current energy, a filter choke and condenser system connected to said rectifier for reducing the ripple component of said unidirectional current, a resistance within said filter choke and condenser system, and means for impressing a rippling potential from said source across said resistance whereby the remaining ripple component of said unidirectional current energy is substantially neutralized, said means consisting of a transformer, a second rectifier, the primary of said transformer being energized by said source and the secondary of which is connected to points along said resistance through said second rectifier.

4. In an electrical rectifying and filtering system, the combination of a source of alternating current energy, a rectifier coupled thereto for the production of unidirectional current energy, a filter choke and condenser system connected to said rectifier for reducing the ripple component of said unidirectional current, and means coupling said source to said system whereby the remaining ripple component of said unidirectional current is substantially neutralized, said means comprising a transformer, having a primary energized by said source a secondary connected to points in said system whereby a ripple potential is developed therein and a current distorting core adapted to distort the energy transferred from said source to said system through the transformer so as to produce harmonics of the frequency of the source of energy to thereby neutralize any similar harmonic components existing in the uni-directional current.

5. In an electrical rectifying and filtering system, the combination of a source of alternating current energy, a rectifier coupled thereto, a filter choke and condenser system connected to said rectifier for reducing the ripple component of said unidirectional current, a resistance within said system, and means for impressing a potential from said source of a phase opposed to the remaining ripple component of said unidirectional current across said resistance whereby the unidirectional current is supplied at substantially constant voltage.

6. In an electrical rectifying and filtering system, the combination of a source of alternating current energy, a rectifier coupled thereto, a filter choke and condenser system connected to said rectifier for reducing the ripple component of said unidirectional current, a resistance within said system, and means for impressing a potential from said source of a phase opposed to the remaining ripple component of said unidirectional current across said resistance whereby the unidirectional current is supplied at substantially constant voltage, said means including a transformer secondary coupled to said source and connected to points along said resistance.

7. In an electrical rectifying and filtering system, the combination of a source of alternating current energy, a rectifier coupled thereto for the production of uni-directional current energy, a filter system connected to said rectifier for reducing the ripple component of said unidirectional current, and means coupling said source to said system whereby the remaining ripple component of said uni-directional current is substantially neutralized, said means comprising a current distorting means including a transformer, the primary of which is energized with alternating current by said source and the secondary of which is connected to points in said system whereby a ripple potential is developed therein, said current distorting means being adapted to distort the energy transferred from the source to said system through the transformer so as to produce harmonics of the frequency of the source and thereby neutralize any similar harmonic components existing in the uni-directional current.

8. In an electrical rectifying and filtering system, the combination of a source of alternating current energy, a rectifier coupled thereto for the production of uni-directional current energy, a filter choke and condenser system connected to said rectifier for reducing the ripple component of said uni-directional current, and a frequency changer device for coupling said source to said system.

9. In an electrical rectifying and filtering system, the combination of a source of alternating current energy, a rectifier coupled thereto for the production of uni-directional current energy, a filter choke and condenser system connected to said rectifier for reducing the ripple component of said uni-directional current, and a saturated core current distorting device for providing an auxiliary coupling between said source and said system.

10. In an electrical rectifying and filtering system, the combination of a source of alternating current energy, a rectifier coupled thereto for the production of uni-directional current energy, a filter system connected to said rectifier for reducing the ripple component of said uni-directional current, and a transformer having its primary energized by said source and its secondary connected to points in said system whereby a ripple potential is developed therein, a core for said transformer said core being maintained at substantially a predetermined saturation point by uni-directional current flowing through said secondary winding.

BENJAMIN F. MIESSNER.